June 23, 1964

B. VAUCHER 3,138,046

DEVICE FOR ADJUSTING THE WORKING POSITION OF TOOLS IN A MACHINE TOOL

Filed Sept. 6, 1960

Inventor
Benjamin Vaucher
By Stevens, Davis, Miller & Mosher
Attorneys

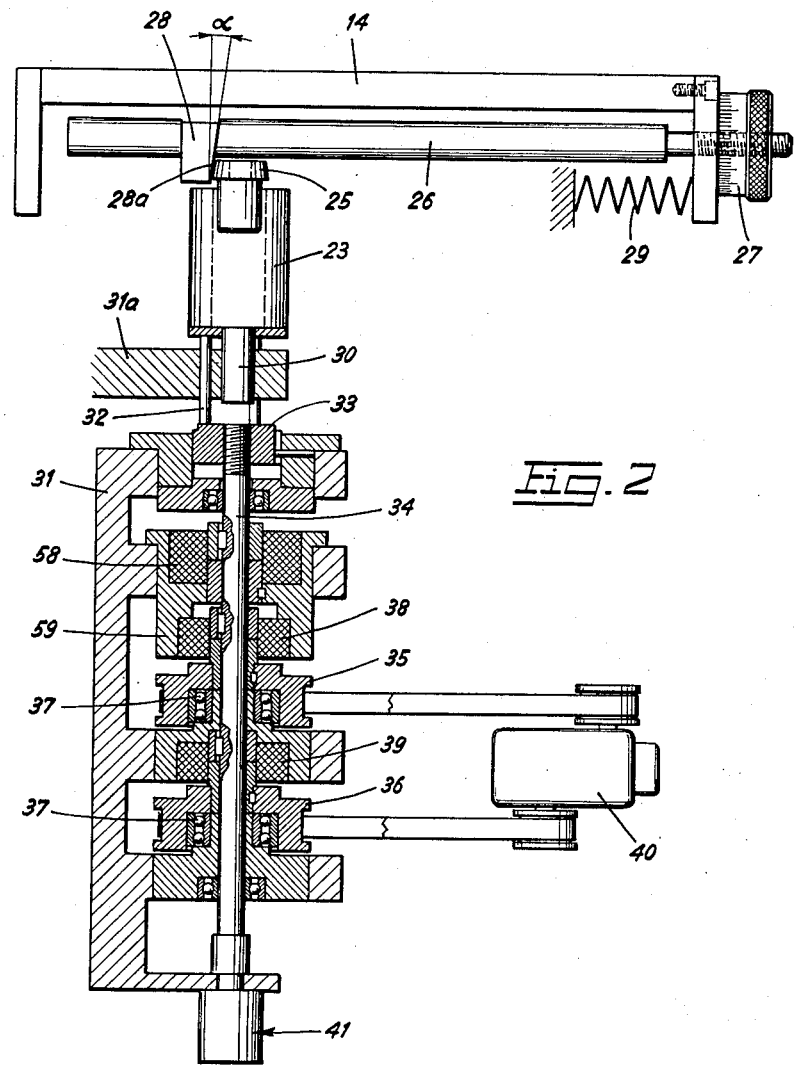

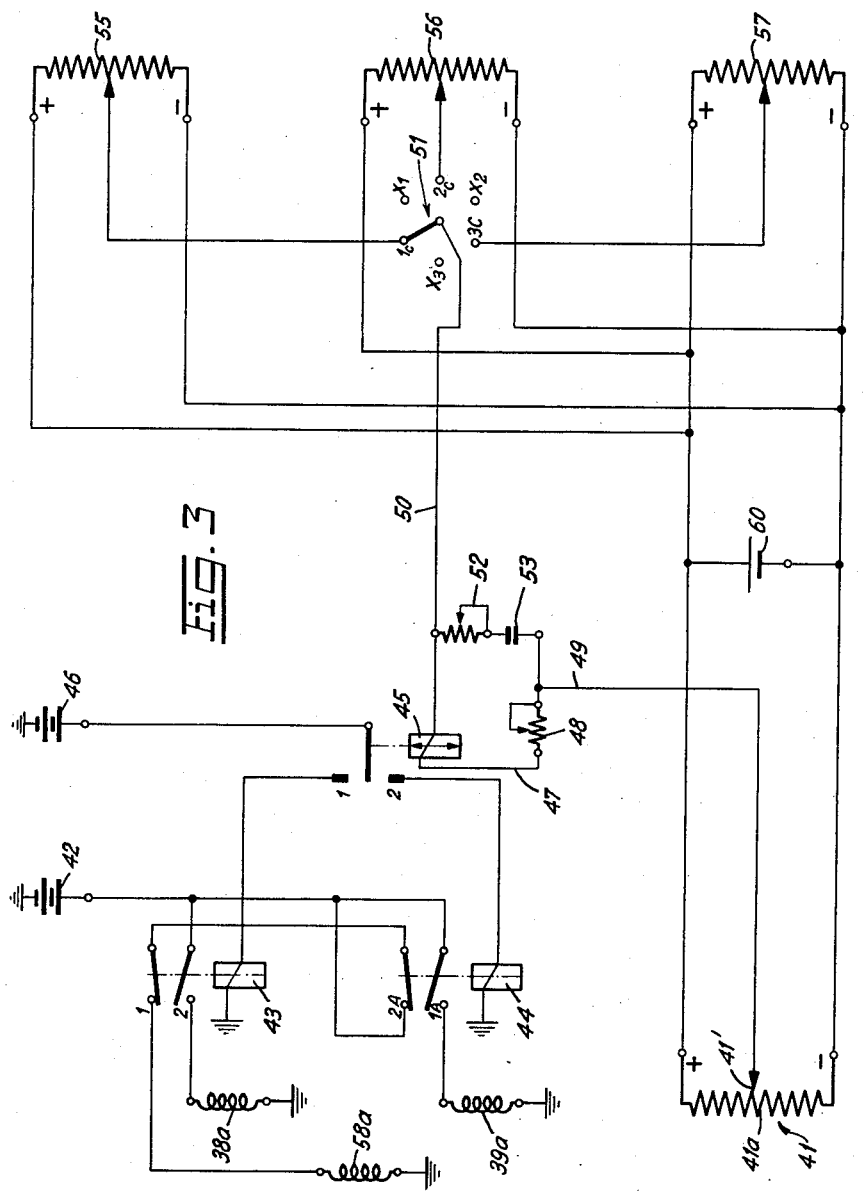

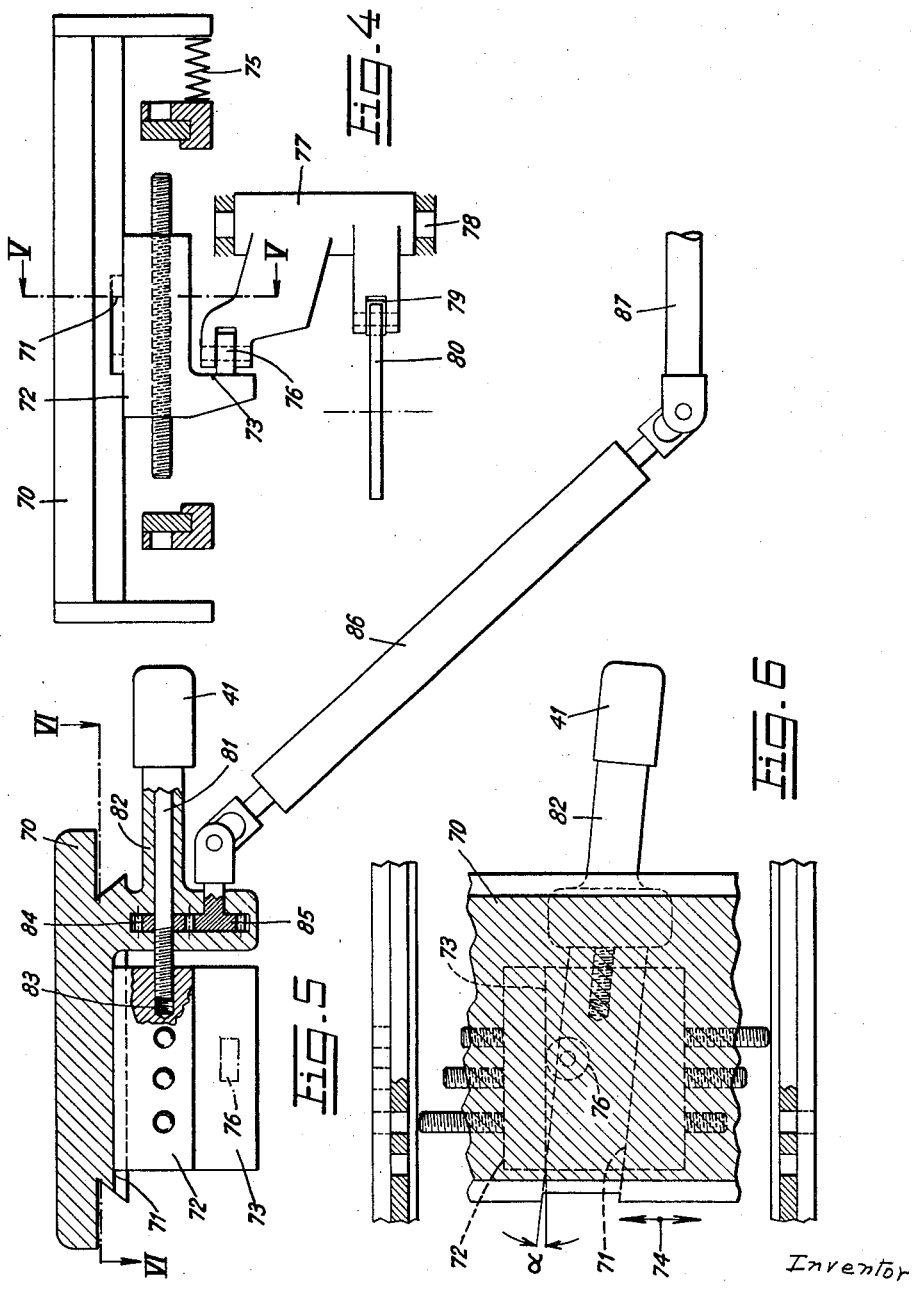

United States Patent Office 3,138,046
Patented June 23, 1964

3,138,046
DEVICE FOR ADJUSTING THE WORKING POSITION OF TOOLS IN A MACHINE TOOL
Benjamin Vaucher, Tramelan, Bern, Switzerland, assignor to Kummer Freres S.A. Fabrique de Machines, Tramelan, Bern, Switzerland
Filed Sept. 6, 1960, Ser. No. 54,316
Claims priority, application Switzerland Sept. 9, 1959
6 Claims. (Cl. 82—24)

This invention relates to devices for adjusting the working position of tools in a machine tool.

Machine tools and in particular lathes in which the working position of a slide carrying a tool and controlled by camming means acting on the slide by means of a rocker arm provided with an adjustable conical roller are already known in the art. In these known devices the conical roller can be adjusted by moving it in the direction of the rocking axis of said arm by means of a micrometric screw actuated by hand.

Similar adjusting devices have been used in particular in copying machine tools such as for instance copying lathes or milling machines. In these cases the conical roller is mounted either on the slide itself or on a pantograph arm or on a similar member.

The known adjusting devices permit one however to adjust the working position of only one tool and the adjusting operation must always be ensured by hand.

The problem of adjusting the working position of several tools is more intricate in automatic lathes and in particular in automatic lathes comprising a slide carrying several tools successively coming in working position during one cycle of machining operations. Each tool could of course be adjusted on the slide by means known in the art. This adjusting operation, which must be done in connection with the tool wear, would however necessitate stopping the machine every time a correction is needed.

It is therefore an object of this invention to provide an adjusting device for the working position of several tools which operates automatically.

Further objects of the invention will become apparent in the course of the following description.

One embodiment and a modification of the mechanical elements thereof which does however not constitute a part of this invention are represented diagrammatically and by way of example in the annexed drawings.

In the drawings:

FIG. 2 is an elevational view of the mechanical elements of the adjusting device part acting on one slide of the machine tool;

FIG. 3 shows the wiring diagram of said adjusting device;

FIG. 4 is an elevational view with some parts in section showing the modified mechanical part of the device;

FIG. 5 is a sectional view along line V—V of FIG. 4, and

FIG. 6 is a horizontal section along line VI—VI of FIG. 5.

Figure 1:
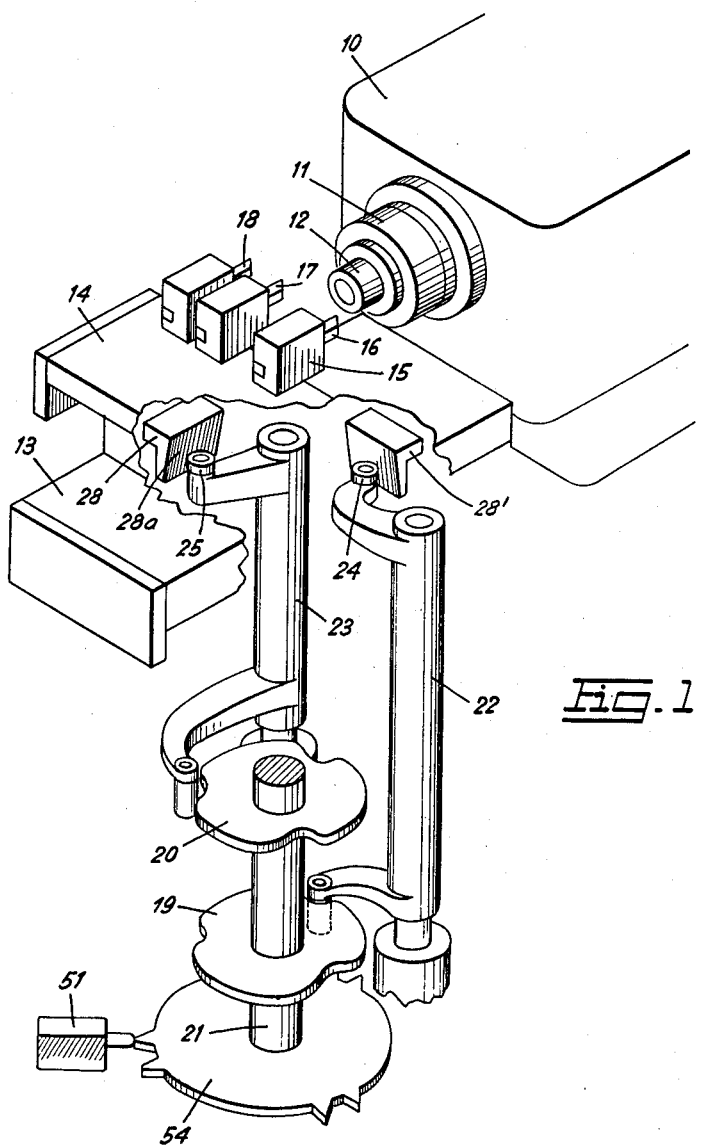
FIG. 1 is an exploded perspective view of the general arrangement of the machine tool provided with the adjusting device according to the invention.

For a better comprehension of the invention some details of a known automatic lathe to which the adjusting device according to the invention can advantageously be applied are first disclosed hereinafter.

The automatic lathe represented comprises a headstock 11 mounted for rotary motion on the upper part of a framework 10. This headstock 11 comprises a chuck for holding work pieces as shown at 12. The lathe's frame 10 carries a compound slide comprising a longitudinal slide 13 and a transverse slide 14 mounted thereon.

This transverse slide 14 is provided with a tool holder 15 carrying three tools 16, 17, 18, which can be for instance forming tools, borers, screwing dies, and so on. The actuation of the compound slide 13, 14 is ensured by two cams 19, 20 respectively, mounted on a camshaft 21 and forming part of cycling means which control all operations of the lathe. This shaft makes one revolution during each cycle of machining operations of the lathe and the cams 19, 20, actuate their corresponding slides at predetermined moments by means of rocker arms 22, 23 carrying rollers 24, 25 which are in contact with rules 28, 28' secured to said slides. The lathe also comprises two analogous adjusting devices which are working independently from one another to adjust the exact positions of slides 13 and 14, respectively, an example of which is shown in FIG. 2.

The transverse slide 14 is provided with a rod 26 adjustable in the moving direction of the slide by means of a micrometric nut 27. This rod 26 is adjusted once when the lathe is itself initially adjusted for machining a series of identical pieces. The nut 27 permits adjusting one coordinate of the tools. A rule 28 is fixed to rod 26 so as to extend in a direction perpendicular to the sliding motion of slide 14. The roller 25 of rocker arm 23 is conical and the side face 28a of rule 28 also makes a corresponding angle $\alpha$ with the vertical, said angle $\alpha$ corresponding to an inclination of 10%. A return spring 29 acting on the slide 14 keeps the roller 25 in contact with rule face 28a.

If the working position of only one tool were to be adjusted, one could proceed in the known manner by moving manually for instance by means of a micrometric screw, either the roller 25 alone or the rocking arm 23 together with the roller 25 about pivoting axis of said arm.

According to the invention the adjusting device disclosed permits one to adjust separately and automatically the working position of each tool carried by the compound slide. This adjusting operation must of course be effected when all tools are out of working position. In the embodiment represented in the drawings there are three tools on the compound slide and each cycle of operation of the machine includes three consecutive phases during each of which one of these tools works.

One embodiment of the adjusting device according to the invention is represented in the lower part of FIG. 2 and in FIG. 3.

The rocker arm 23 can freely slide along a vertical shaft 30 the lower end of which is secured to a piece 31a rigidly fixed to the framework 10 as well as a support 31 in any desired manner (not shown). The lower face of rocker arm 23 rests on rods 32 (only two of which are shown) which are guided in borings provided in piece 31a in a direction extending parallel with the shaft axis. The rods 32 themselves rest on the upper face of a nut 33 slidably splined to the support 31. This nut 33 is engaged by the threaded upper portion of a screw 34 coaxial to shaft 30. The lower rocker face and the nut upper face extend perpendicularly to the axis of shaft 30. The screw 34 is axially immovable. It can freely rotate within two pulleys 35 and 36 mounted on a support 31 by means of ball-bearings 37. These pulleys are fixed to the driving elements of two electro-magnetic clutches 38, 39 each having a driven element fixed for rotary motion to screw 34. The pulleys 35, 36 are always driven in opposed directions with respect to one another by means of a motor 40. A potentiometer 41 of high precision is mounted on support 31 and contains therein the resistance wire 41a (FIG. 3). The sliding contact 41' (FIG. 3) of the potentiometer 41 is fixed to the lower end of screw 34 to be rotated therewith. A clutch brake 58 is also secured to screw 34 and this brake is arranged so as to engage a fixed element 59 in energized condition to immediately stop the rotary motion of screw 34.

The electrical part of the adjusting device according to the invention is represented in FIG. 3 in which the coils of the electro-magnetic clutches 38, 39 and 58 are designated by the reference numerals 38a, 39a and 58a respectively.

The coils 38a, 39a can be connected to a battery 42 by means of the contact 2 of the relay 43 and the contact 1A of the relay 44, respectively, said contacts being closed in the energized condition of said relays. One terminal of the coils of each relay is grounded while the other terminals of said coils are connected to the fixed contacts 1B and 2B, respectively, of a polarity-directional relay 45 the movable contact of which is connected to a battery 46. A lead 47, a potentiometer 48 to adjust the sensitivity of relay 45, and a lead 49 connect one terminal of the polarity-directional relay 45 to the sliding contact 41' of potentiometer 41. The other terminal of relay 45 is connected to the fixed contact of a step-by-step switch 51 by means of a lead 50. A potentiometer 52 and a condenser 53 are provided between leads 49 and 50 to adjust the time delay position of the polarity-directional relay 45. The movable contact of switch 51 is actuated by a disc 54 (FIG. 1) fixed on to the control shaft 21 and provided with actuating fingers so as to actuate the movable contact of said switch during a small time period sufficient to ensure positioning the tools and to bring this movable contact on the fixed contact 1C just before tool 16 comes in working position, on contact 2C just before tool 17 comes in working position and on contact 3C just before tool 18 comes in working position. In the meantime the movable contact of said switch rests in the intermediate positions $X_1$, $X_2$ and $X_3$. The fixed contacts 1C, 2C and 3C are connected to the manually adjustable sliding contact of three adjustable potentiometers 55, 56, 57, respectively. The resistance wires of these three potentiometers are permanently connected in parallel on the diagonal of a Wheatstone bridge which comprises the battery 60. The terminals of the resistance wire 41a of potentiometer 41 are also connected to that diagonal of the bridge so that the polarity-directional relay functions as detector of zero deflection.

The adjusting device described functions as follows. As soon as the lathe's operator notes a difference of sizes on the work pieces for instance of the portion formed by tool 16 he only need actuate the sliding contact of the corresponding adjusting potentiometer 55. Before tool 16 starts machining the next piece the movable contact of switch 51 engages the fixed contact 1C. The polarity-directional relay 45 is thus energized in a manner corresponding to the potential difference between the correcting or adjusting potentiometer 55 and the potentiometer 41. The polarity-directional relay closes its contact 1B and thus energizes the clutch 38 by means of relay 43. The screw 34 is driven in rotation and it moves the sliding contact 41' of potentiometer 41 until there is no longer any potential difference in the Wheatstone bridge. At that moment the movable contact of the polarity-directional relay leaves the fixed contact 1B and the screw 34 is immediately stopped. The same function is repeated for tools 17 and 18 under the control of adjusting potentiometers 56 and 57, respectively, which are operationally connected to the slide positioning means by switch 51 which acts as preselecting means.

When the movable contact of the polarity-directional relay rests in an inoperative position, the movable contacts 2 and 2A of relays 43 and 44, respectively, close the energizing circuit of clutch brake 58, said circuit connecting the battery 42 to ground through the contact 1 of relay 43, the contact 2A of relay 44 and coil 58a of clutch 58.

It will be noted that almost the whole adjusting device described is used to adjust the working position of each of the three tools. This adjusting device must only comprise a number of adjusting potentiometers such as 55, 56, 57 which corresponds to the number of tools, adjusting said potentiometers being ensured without considering the exact position of the slide, since each potentiometer automatically becomes operative at the right moment of each cycle.

The adjusting device disclosed constitutes an important step towards the complete automation of the lathe. In the embodiment described the operation of the adjusting device only requires a manual intervention to adjust the potentiometers so that this adjusting operation could also be ensured by automatic measuring apparatus.

The adjusting device according to the invention can not only be used in the particular case described above. The modification described hereinafter shows another possibility of using said adjusting device in a quite different case. The mechanical part of said modification forms however no part of this invention.

In FIGS. 4 and 5 showing said modification the slide 70 which can be either a longitudinal or a transverse slide is provided at its lower part with guiding means 71 for a rule 72 having a face 73 perpendicular to the sliding direction 74 of slide 70. The guiding means 71 are disposed with respect to face 73 at a small angle $\alpha$ of for instance 10°.

The face 73 of rule 72 bears against a cylindrical roller 76 by means of a spring 75 acting on slide 70. The roller is mounted at one end of a double armed lever 77 rockably mounted on a fixed trunnion 78. Another cylindrical roller 79 is mounted at the end of the other lever arm to follow the cam 80.

A screw 81 axially fixed but mounted for rotary motion on a support 82 fixed to slide 70 has its threaded portion engaging a tapped bore 83 provided in rule 72. This screw is connected by means of a couple of toothed wheels 84, 85 and a telescoped universal shaft 86 to an arbor 87 journalled in fixed bearings (not shown). Arbor 87 is driven in rotation in one direction by means of the electro-magnetic clutch 38, and in the other direction by means of the electro-magnetic clutch 39 (see FIG. 2). The body members of clutches 38 and 39 rotate in opposed directions. The potentiometer 41 is fixed on to support 82. Its sliding contact is actuated by screw 81. In a further modification this potentiometer could however also be fixed to the support (not shown) of arbor 87 and the sliding contact of this potentiometer could then be driven by this arbor.

The electrical control means of the modification shown in FIGS. 4 and 5 are exactly the same as those disclosed above and shown in FIG. 3.

The function of this modification is therefore the same as that disclosed above.

While one embodiment and a modification thereof have been described in detail hereabove, it should be understood that still further modifications will appear obvious to those skilled in the art without departing from the spirit of the invention or sacrificing the advantages thereof.

I claim:
1. In a machine tool, in combination, a slide, a plurality of tools on said slide to effect cycles of machining operations, cycling means acting on said slide to bring each of said tools after one another in working position at a predetermined moment of each cycle of machining operations, independent positioning means to determine the exact working position of each of said tools, adjustable controlling means associated with each of said tools, and transmitting means operative under the action of said cycling means during a short period immediately preceding the moment at which said cycling means bring a tool in working position and connecting then the adjustable controlling means of the particular tool to said positioning means to set the latter in accordance with the adjusted position of said adjustable controlling means.

2. In a machine tool, in combination, a slide, a plurality of tools on said slide, camming means to control cycles of machining operations, motion transmitting means provided between and operatively interconnecting said camming means and said slide to bring each of said tools after one another in working position at a predetermined moment of each cycle of machining operations, said motion transmitting means comprising a screw-threaded rotatable member producing upon a rotary displacement thereof an adjusting motion of said slide, two driving members always rotating in opposed directions, clutch means arranged for connecting either one of said driving members to said screw-threaded member, adjustable controlling means operatively associated with each of said tools and arranged for producing a predetermined signal, recording means operatively associated with said screw-threaded member and arranged for producing a predetermined signal, recording means operatively associated with said screw-threaded member and arranged for producing a signal comparable to those produced by said adjustable controlling means, said screw-threaded member signal corresponding to the actual position of said screw-threaded member, comparing means permanently connected to said recording means, switching means to connect said adjustable controlling means after one another to said recording means, means synchronised by said camming means and actuating said switching means to ensure the interconnections of said adjustable controlling means and said recording means when respective tools of said adjustable controlling means are going to move in working position, and setting means capable of actuating said clutch means to operatively connect one of said driving members to said screw-threaded member as long as the signal produced by the adjustable controlling means switched to said comparing means exceeds the signal produced by said recording means and the other one of said driving members to said screw-threaded member as long as the signal produced by said recording means exceeds the signal produced by said adjustable controlling means.

3. In a machine tool, in combination, a slide, a plurality of tools on said slide to effect cycles of machining operations, cycling means acting on said slide to bring each of said tools after one another in working position at a predetermined moment of each cycle of machining operations, said cycling means including a slide positioning member, a follower secured to said slide, a contact member carried by said slide positioning member in engagement with said follower, means connected to said slide positioning member for shifting said slide positioning member for each operating cycle, and means for additionally shifting said contact member for each operating cycle to compensate for variations in tool positioning.

4. In a machine tool, in combination, a slide, a plurality of tools on said slide to effect cycles of machining operations, cycling means acting on said slide to bring each of said tools after one another in working position at a predetermined moment of each cycle of machining operations, said cycling means including a slide positioning arm, a roller carried by said arm, a rule secured to said slide and having a surface engaged by said roller, said surface being tapered in the direction of the axis of rotation of said roller, means connected to said arm for swinging and positioning said arm for each operating cycle, and means for separately axially shifting said roller for each operating cycle to compensate for variations in tool positioning.

5. In a machine tool, in combination, a slide, a plurality of tools on said slide to effect cycles of machining operations, cycling means acting on said slide to bring each of said tools after one another in working position at a predetermined moment of each cycle of machining operations, said cycling means including a slide positioning member, a follower secured to said slide, a contact member carried by said slide positioning member in engagement with said follower, means connected to said slide positioning member for shifting said slide positioning member for each operating cycle, and means for additionally shifting said contact member for each operating cycle to compensate for variations in tool positioning, said means for additionally shifting said contact member including a shaft, means for selectively rotating said shaft in opposite directions, a contact member shifting member screw threaded on said shaft for movement axially of said shaft, a balanceable electrical circuit including a potentiometer connected to said shaft for adjustment, one other potentiometer for each tool, and electrical control means for said shaft rotating means operated by a momentary unbalanced condition of said circuit.

6. In a machine tool, in combination, a slide, a plurality of tools on said slide to effect cycles of machining operations, cycling means acting on said slide to bring each of said tools after one another in working position at a predetermined moment of each cycle of machining operations, said cycling means including a slide positioning arm, a roller carried by said arm, a rule secured to said slide and having a surface engaged by said roller, said surface being tapered in the direction of the axis of rotation of said roller, means connected to said arm for swinging and positioning said arm for each operating cycle, and means for separately axially shifting said roller for each operating cycle to compensate for variations in tool positioning, said means for axially shifting said roller including a shaft, means for selectively rotating said shaft in opposite directions, a roller shifting member screw threaded on said shaft for movement axially of said shaft, a balanceable electrical circuit including a potentiometer connected to said shaft for adjustment, one other potentiometer for each tool, and electrical control means for said shaft rotating means operated by a momentary unbalanced condition of said circuit.

References Cited in the file of this patent
UNITED STATES PATENTS

| | | |
|---|---|---|
| 2,831,387 | Ovshinsky | Apr. 22, 1958 |
| 2,895,386 | Mann | July 21, 1959 |
| 2,913,964 | Mann | Nov. 24, 1959 |